(12) United States Patent
Radermecker

(10) Patent No.: US 12,038,508 B2
(45) Date of Patent: Jul. 16, 2024

(54) SENSOR FOR CONTROLLING AN AUTOMATIC DOOR

(71) Applicant: BEA SA, Angleur (BE)

(72) Inventor: Gautier Radermecker, Liege (BE)

(73) Assignee: BEA SA, Angleur (BE)

( * ) Notice: Subject to any disclaimer, the term of this patent is extended or adjusted under 35 U.S.C. 154(b) by 938 days.

(21) Appl. No.: 16/604,050

(22) PCT Filed: Apr. 10, 2018

(86) PCT No.: PCT/EP2018/059187
§ 371 (c)(1),
(2) Date: Oct. 9, 2019

(87) PCT Pub. No.: WO2018/189192
PCT Pub. Date: Oct. 18, 2018

(65) Prior Publication Data
US 2021/0011160 A1    Jan. 14, 2021

(30) Foreign Application Priority Data

Apr. 10, 2017 (EP) .................................. 17165848

(51) Int. Cl.
*G01S 17/00* (2020.01)
*G01S 7/481* (2006.01)
(Continued)

(52) U.S. Cl.
CPC ........... *G01S 17/88* (2013.01); *G01S 7/4814* (2013.01); *G01S 17/42* (2013.01); *G01S 17/58* (2013.01);
(Continued)

(58) Field of Classification Search
USPC ....................................................... 356/5.01
See application file for complete search history.

(56) References Cited

U.S. PATENT DOCUMENTS

| 7,042,492 | B2 |   | 5/2006 | Spinelli |
| 7,274,438 | B2 | * | 9/2007 | Doemens ............... G01S 17/04 |
|   |   |   |   | 356/5.04 |

(Continued)

FOREIGN PATENT DOCUMENTS

| CN | 101293529 A | 10/2008 |
| CN | 1022214309 A | 10/2011 |

(Continued)

OTHER PUBLICATIONS

The International Bureau of WIPO, International Preliminary Report On Patentability, Oct. 24, 2019, pp. 1-12, International Application No. PCT/EP2018/059187.

(Continued)

*Primary Examiner* — James R Hulka
(74) *Attorney, Agent, or Firm* — WOODLING, KROST AND RUST

(57) ABSTRACT

The invention relates to a Sensor (10) for controlling an automatic door, where the sensor (10) comprises a laser scanner (12) for detecting the presence of an object, with at least one laser curtain (22, 32, 34) in a predefined detection area of the scanning field, where the sensor (10) comprises a distance data acquisition unit (13) that is embodied to acquire the distances of the points of reflection of the reflected signal by evaluation of time of flight, a presence detection unit (15), where the result of the distance data acquisition unit (13) is fed to the presence detection unit (15), where the distance data acquisition unit (13) forwards the distance data information to the presence detection unit (15), where the presence detection unit (15) evaluates, if an object is detected within the predefined detection area by analysing the distance data, where a presence detection information is created and fed to an at least one sensor output port (18, 18b). The invention is characterized in that the sensor further comprises an object information unit (11)

(Continued)

Figure 1A:
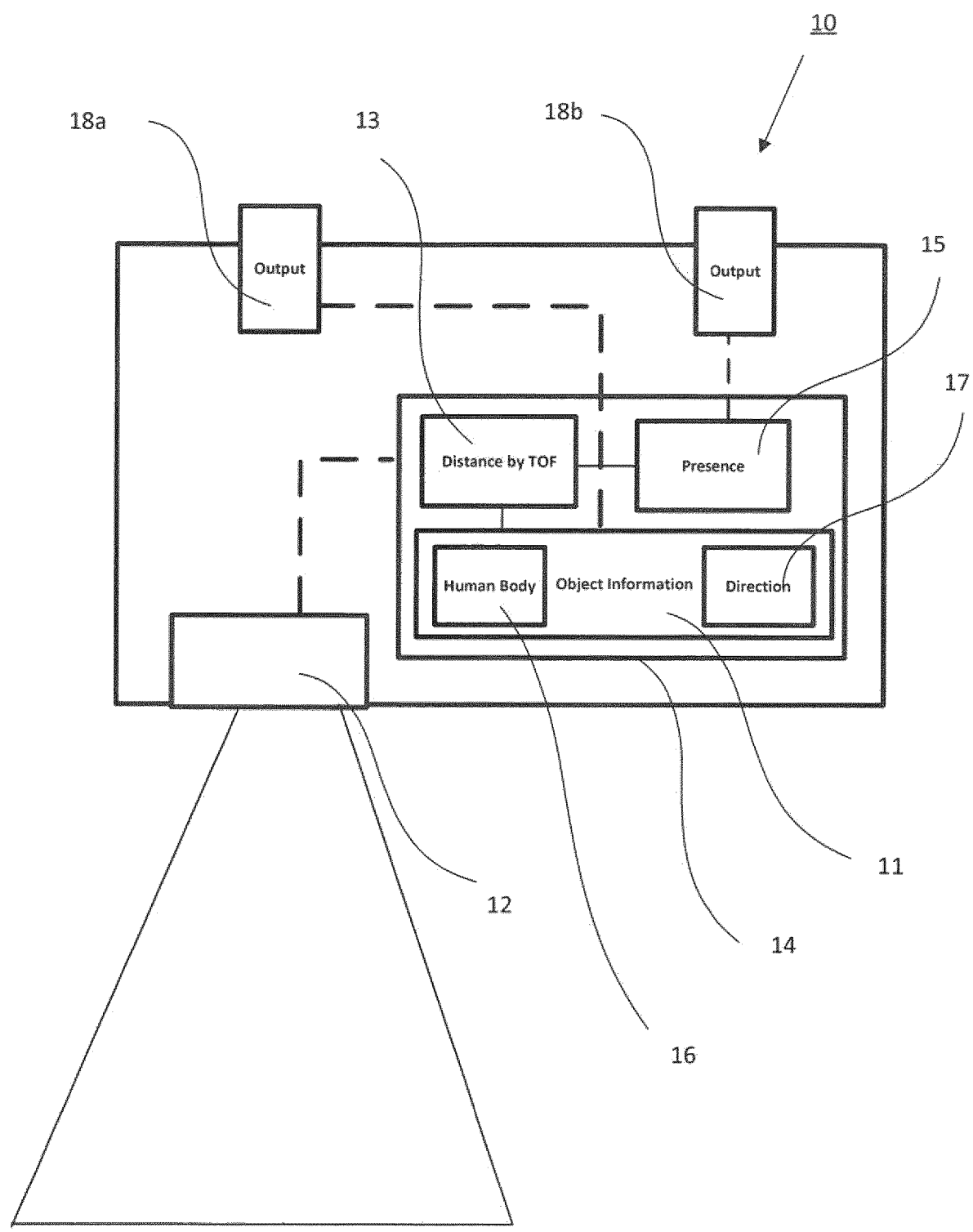

comprising a human body identification unit (16), where the object information unit (11) receives the distance data, and the human body identification unit (16) uses the distance data to determine if the detected object is a human body, where the object information unit (11) creates an object information that is fed to the at least one output port (18, 18*a*).

11 Claims, 10 Drawing Sheets

(51) Int. Cl.
*G01S 17/42* (2006.01)
*G01S 17/58* (2006.01)
*G01S 17/88* (2006.01)
*E05F 15/73* (2015.01)
*E05F 15/74* (2015.01)

(52) U.S. Cl.
CPC ......... *E05F 15/74* (2015.01); *E05F 2015/765* (2015.01); *E05Y 2400/44* (2013.01); *E05Y 2900/132* (2013.01)

(56) References Cited

U.S. PATENT DOCUMENTS

| | | | |
|---|---|---|---|
| 7,495,556 B2 | 2/2009 | Eublen et al. | |
| 7,701,557 B2 | 4/2010 | Doemens et al. | |
| 7,940,300 B2 | 5/2011 | Spinelli | |
| 8,523,667 B2* | 9/2013 | Clavin | G06V 40/103 715/810 |
| 8,955,253 B2 | 2/2015 | Kanki et al. | |
| 9,100,367 B2* | 8/2015 | Akashika | H04L 41/0803 |
| 9,497,840 B2* | 11/2016 | Wehrens | H05G 2/008 |
| 9,799,044 B2* | 10/2017 | Takahashi | G01S 17/42 |
| 2001/0030689 A1* | 10/2001 | Spinelli | E05F 15/73 340/541 |
| 2005/0078297 A1 | 4/2005 | Doemens et al. | |
| 2006/0139453 A1* | 6/2006 | Spinelli | H04N 7/186 348/E7.087 |
| 2006/0169876 A1* | 8/2006 | Zambon | G01S 7/481 250/221 |
| 2006/0187037 A1* | 8/2006 | Eubelen | E05F 15/43 340/552 |
| 2007/0181786 A1 | 8/2007 | Doemens et al. | |
| 2010/0076651 A1* | 3/2010 | Nakakura | E05C 17/00 701/49 |
| 2010/0191369 A1* | 7/2010 | Kim | G07F 5/18 700/235 |
| 2010/0265049 A1* | 10/2010 | Koike | B60Q 9/008 340/435 |
| 2011/0176000 A1* | 7/2011 | Budge | G06K 9/6228 348/E7.054 |
| 2011/0237324 A1* | 9/2011 | Clavin | G06V 40/103 705/26.25 |
| 2011/0249263 A1* | 10/2011 | Beck | C23C 14/54 356/342 |
| 2011/0260848 A1* | 10/2011 | Rodriguez Barros | B60Q 1/324 340/438 |
| 2012/0042043 A1 | 2/2012 | Akashika et al. | |
| 2013/0094705 A1* | 4/2013 | Tyagi | F16P 3/142 382/103 |
| 2013/0135438 A1 | 5/2013 | Lee et al. | |
| 2013/0201291 A1* | 8/2013 | Liu | G06F 3/012 348/47 |
| 2013/0255154 A1 | 10/2013 | Kanki et al. | |
| 2015/0083936 A1 | 3/2015 | Wehrens | |
| 2015/0143459 A1* | 5/2015 | Molnar | H04L 67/02 726/2 |
| 2015/0186903 A1 | 7/2015 | Takahashi et al. | |
| 2015/0259967 A1* | 9/2015 | Kamisawa | E05F 15/77 49/31 |
| 2015/0261304 A1* | 9/2015 | Kamisawa | E05F 15/77 340/5.28 |
| 2016/0012297 A1* | 1/2016 | Kanga | G06T 7/251 382/103 |
| 2016/0298809 A1* | 10/2016 | Lutz | G01V 8/20 |
| 2016/0309065 A1* | 10/2016 | Karafin | H04N 23/45 |
| 2016/0349835 A1* | 12/2016 | Shapira | G06F 3/016 |
| 2017/0243373 A1* | 8/2017 | Bevensee | G03B 35/10 |
| 2017/0300757 A1* | 10/2017 | Wolf | G06V 20/52 |
| 2018/0089501 A1* | 3/2018 | Terekhov | G06V 40/168 |
| 2019/0180124 A1* | 6/2019 | Schindler | G06F 18/22 |
| 2019/0218847 A1* | 7/2019 | Agam | B66B 13/26 |
| 2020/0386605 A1* | 12/2020 | Oren | G01G 3/14 |

FOREIGN PATENT DOCUMENTS

| | | | | |
|---|---|---|---|---|
| CN | 102747919 A | 10/2012 | | |
| CN | 203102401 U | 7/2013 | | |
| CN | 103632146 A | 3/2014 | | |
| CN | 104234575 A | 6/2016 | | |
| CN | 205608459 U | 9/2016 | | |
| DE | 102014113572 A1 * | 3/2016 | ......... B61L 15/0072 |
| DE | 102015200518 A1 | 7/2016 | | |
| EP | 2395368 A1 | 11/2010 | | |
| EP | 2212498 B1 * | 1/2014 | ............. E05F 15/43 |
| EP | 3135846 A1 * | 3/2017 | ............. E05F 15/40 |
| JP | 2004295798 A | 10/2004 | | |
| JP | 2010133200 A | 6/2010 | | |
| JP | 4907732 B1 | 1/2012 | | |
| JP | 2012215555 A | 11/2012 | | |
| JP | 2013061273 A | 4/2013 | | |
| JP | 2014142288 A | 8/2014 | | |
| JP | 2017014801 A | 1/2017 | | |
| JP | 2006285484 A | 10/2019 | | |
| TW | 491232 U | 6/2014 | | |
| WO | 2012042043 | 4/2012 | | |

OTHER PUBLICATIONS

Japan Patent Office, Office Action, Notice of Reasons for Rejection, Jan. 5, 2022, pp. 1-6, Patent Application No. 2020-504444.

Japan Patent Office Action, English Translation of the Office Action, English Translation of the Notice of Reasons for Rejection, Jan. 5, 2022, pp. 1-5, Patent Application No. 2020-504444.

Akamatsu et al., Development of a Person Counting System Using a 3D Laser Scanner, Proceedings of The 2014 IEEE International Conference On Robotics and Biomimetics, Dec. 5-10, 2014, pp. 1983-1988, Bali, Indonesia.

Nishida et al., Development of Intelligent Automatic Door System, 2014 IEEE International Conference On Robotics & Automation (ICRA), May 31-Jun. 7, 2014, pp. 6368-6374.

European Patent Office, International Search Report, Jul. 31, 2018, pp. 1-4.

International Searching Authority, European Patent Office, Written Opinion of the International Searching Authority, International Application No. PCT/EP2018/059187, Jul. 31, 2018, pp. 1-8.

European Patent Office, Extended European Search Report, Application No. EP 17165848, Oct. 24, 2017, pp. 1-9.

Chinese Office Action Dated Mar. 23, 2023 With English Translation Appended Thereto, Application Serial No. 201880038289.2; Applicant is Bea Sa, Title Sensor for Controlling an Automatic Door.

Chinese Office Action Dated Aug. 15, 2023 With English Translation Appended Thereto, Application Serial No. 201880038289.2; Applicant is Bea Sa, Title Sensor for Controlling an Automatic Door.

* cited by examiner

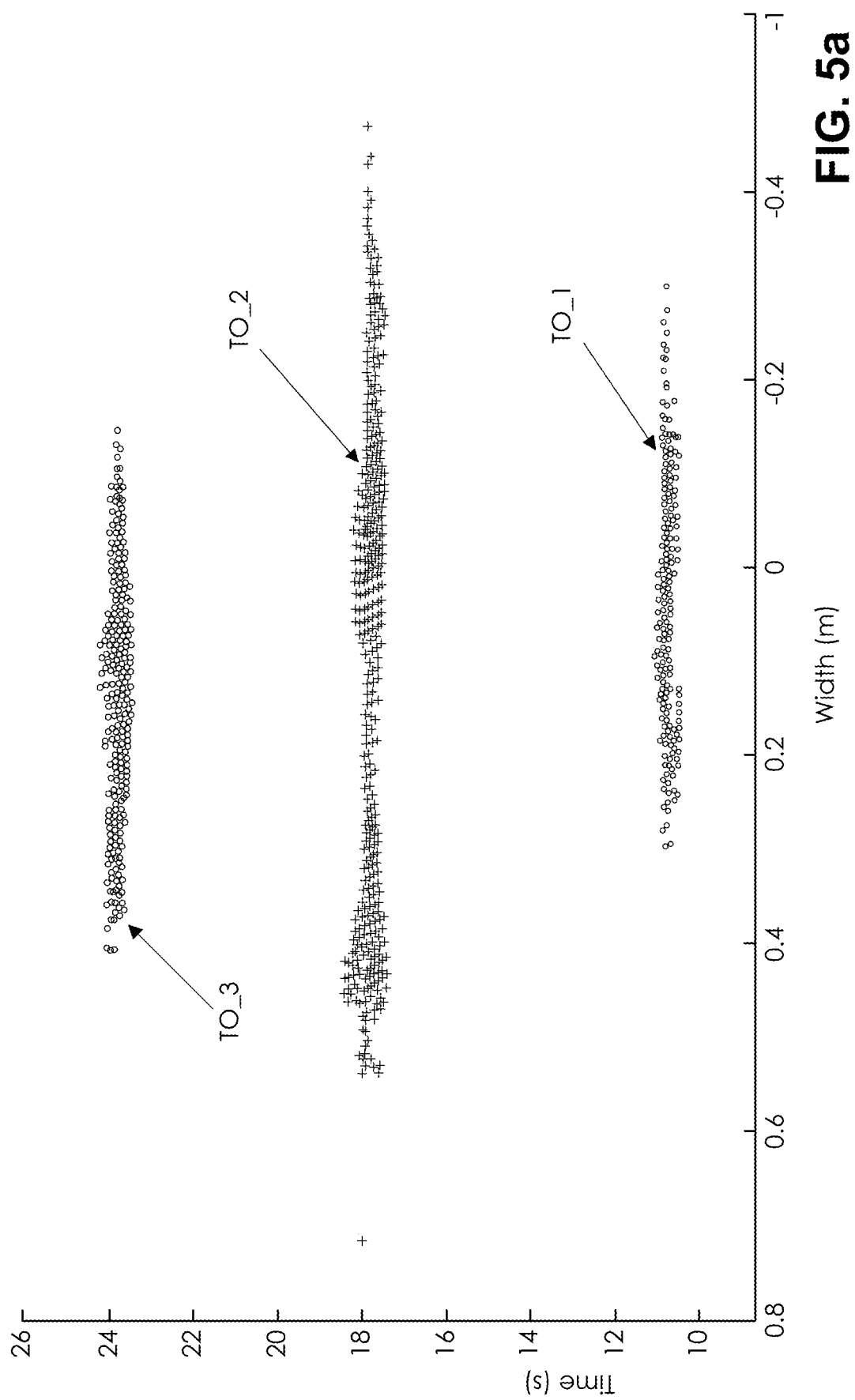

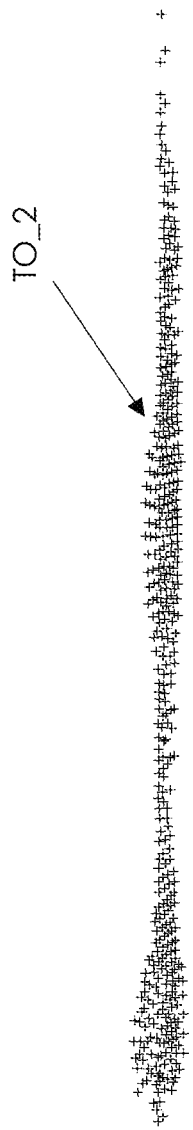

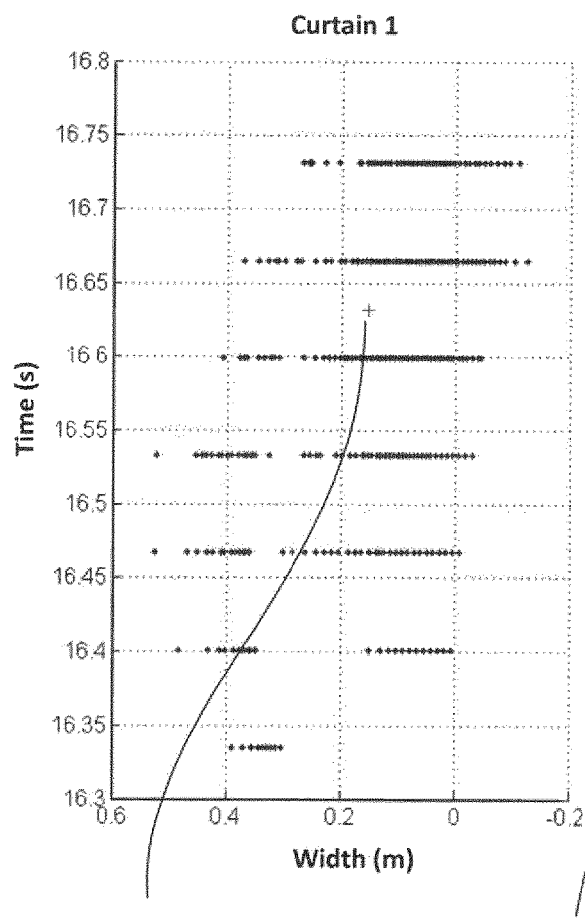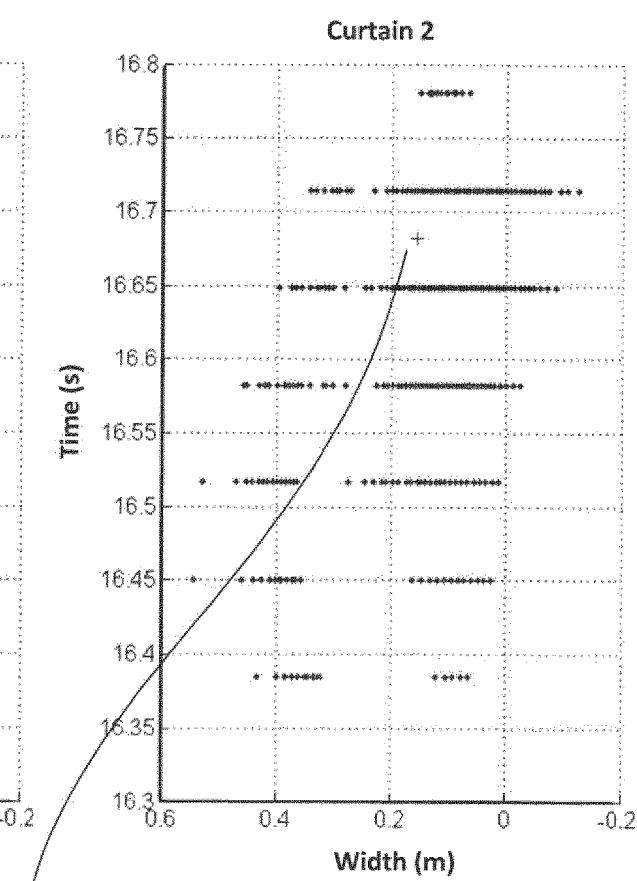
Fig. 8a
Fig. 8b

SENSOR FOR CONTROLLING AN AUTOMATIC DOOR

The invention refers to a sensor for controlling automatic doors.

Sensor for controlling an automatic door, where the sensor comprises a laser scanner for detecting the presence of an object within a predefined detection area of its laser curtain, where the sensor comprises a presence detection output port to which a presence detection signal is fed. This allows a safe operation of the door. The laser scanner derives points of reflection by a distance measurement using "Time of Flight" technology.

Such a door sensors are optimized with regard to their behavior of passing objects that are usually persons.

According to this, Nishida Daiki et al "Development of intelligent automatic door system" 2004, IEEE International conference on robotics and automation, 31 May 2014, pages 6368-6374, discloses an intelligent door sensor that includes the evaluation of speed and direction into its control decisions.

In addition to door control sensors, sensors for detecting persons are known, which evaluate whether or not an detected object is a human being or not.

Akamatsu Shun-Ichi et al. "Development of a person counting system using 3D laser scanner", 2014 IEEE International conference on robotics and BIOMIMETICS, IEEE, 5 Dec. 2014, pages 1983-1988, discloses a laser scanner for counting persons, only. The counting application is restricted to persons does not provide any presence detection in order to control an automatic door.

WO 2012/042043 A1 also discloses a person detection unit to apply an access control system based on a laser scanner. The system e.g. forbids access if two or more persons attempt to enter a door at the same time.

It is the object of the invention to improve the control possibilities of a sensor to allow a more specific behavior.

In a known manner, a door sensor for detecting the presence of an object within a predefined detection area of the scanning field comprises a laser scanner with at least one laser curtain, where the sensor comprises a distance data acquisition unit that is embodied to acquire the distances of the points of reflection of the reflected laser beam of the laser scanner from an object by evaluation of time of flight.

The sensor further comprises a presence detection unit that receives the distance data information as result of the distance data acquisition unit, where the distance data acquisition unit forwards the distance data information to the presence detection unit. The presence detection unit evaluates if an object is detected within the predefined detection area by analysing the distance data. The presence detection unit is embodied to create a presence detection information that is fed to an at least one sensor output port. Usually this signal is used by door controllers for safety purposes.

According to the invention the sensor further comprises an object information unit comprising a human body identification unit, where the object information unit receives the distance data, and the human body identification unit uses the distance data to determine if the detected object is a human body, where the object information unit creates an object information that is fed to the at least on output port.

Preferably the signal of the presence detection unit is processed in real-time, where the result of the human body identification unit is based on an accumulation of distance data. For example, the presence detection signal may have a response time being less than 90 ms. The sensor is able to detect objects that are smaller than 10 cm.

According to the additional information gathered a door controller may act differently by detecting the presence of a human body and the presence of a non-human body.

Due to a further aspect of the invention the object information unit may comprise a counting unit to count the number of human bodies detected by the sensor, so that the counting information could be provided on an output port.

In addition to basic information that is essential for controlling and/or safeguarding an automatic door, further additional information like the counting information can be used for controlling a door e.g. keep it closed after a certain number of human bodies has entered. The additional information could be derived for statistical purposes.

Furthermore, the laser scanner may generate multiple laser curtains and the object information unit comprises a motion detection unit for detecting motion and especially identifying the moving direction of an object.

This object information can be used to control the automatic door, for example trigger the opening of the door once an approaching object is detected. The object information can, therefore, put some sort of approaching signal to the at least one output port, independent of the object type.

Beside this, by deriving the information whether an object is a human body and the information of its direction, a more precise counting can take place. According to this option a net count can be defined in a certain direction.

According to an embodiment of the invention, the sensor comprises one output port where the presence detection information and the object information are fed to the same at least on output port. A CAN or a LON-Bus may be suitable output ports for supporting both types of information.

In a further aspect of the invention the sensor comprises at least two output separate ports where a first output port is dedicated to the presence information and where a second output port is dedicated to object information. A first output port comprises a relay output, where as the second output port could for example be based on an ethernet protocol.

The human body identification unit may be embodied as a computer implemented method on a processing unit, e.g. a microprocessor that runs a computer implemented procedure and may contain further parts of programs being further units.

The method for determination of a human body based on the distance of the measured points of reflection is described in detail below.

The human body identification unit comprises an evaluation unit that combines the distance information of the points of reflection with the direction of the pulse to retrieve a position within a monitored area, the evaluation unit combines the points of reflection belonging to an detected object in an evaluation plane having a z-axis that is related to the height and a perpendicular one to the Z-axis related to the width in the direction of the lateral extension of the laser curtain.

According to the invention, the evaluation plane is evaluated based on density distribution over the Z-axis and the evaluation result is compared to anthropometric parameters by the evaluation unit.

The monitored area is defined by the laser curtain and has a vertical height direction and two lateral directions, a depth and a width, where all are perpendicular to one another. In case of a single vertical laser curtain the depth of the monitored area equals the depth of the laser curtain.

The evaluation plane may have a Z-axis that matches the vertical axis of the vertical plane and/or an evaluation width extension that matches the width of the monitored area.

Nevertheless, the Z-axis e.g. may be defined along a laser curtain inclined to the vertical direction, but the width may still correspond to the width of the laser curtain.

Anthropometric parameters according to the invention are human body measures and/or human body proportions.

Anthropometric parameters especially are parameters that especially relate to height, width, shoulder width, shoulder height, head width, total height of a human body.

Based on the density distribution in the evaluation plane the evaluation unit decides, whether or not the density distribution corresponds to that of a human body.

To determine whether a detected object is a human body, the density distribution along the Z-axis is evaluated, where the Z-axis represents the height of a detected object. The density distribution corresponding to a human body comprises two peaks, where one peak is approximately at the top of the head the second peak is approximately at the top of the shoulder.

The determination is preferably done to determine the ratio of the height of the head to the height of the shoulder. As the ratio head to shoulder height is an anthropometric parameter that is essentially equal for all human beings and above all is not dependent on absolute height a reliable distinction of human beings is possible according to the evaluation of the density distribution.

In addition to the density distribution the evaluation unit may evaluate the width of an object in a further step. Therefore, it analyses the points of reflection in the evaluation plane belonging to an object at the position of the peaks of density distribution and determines the effective width of head and shoulder of the human body.

Due to integration of this information the evaluation can be achieved in a more precise manner. A valid head and shoulder width ratio can be predefined to check whether it matches the result derived from the evaluation density distribution evaluation. The result can be compared to the result of the density evaluation. If both evaluations are positive it is quite likely that the detected object is a human body.

Furthermore, the evaluation unit may count the number of points of reflection within the peak zones of the density distribution evaluation. If the number is below a predefined number, the measurement will be disregarded.

The movement of the human body takes place in a moving direction, where the moving direction basically is a vector of width and depth. Especially in door applications the moving direction is perpendicular to the width direction and therefore, the orientation of the shoulders of a human body is usually aligned with the width direction.

According to the invention, single evaluation objects can be identified out of all points of reflection of the evaluation plane and a subset of points of reflection is created for each evaluation object, which is then subjected to density distribution analysis.

According to this there can be a decision on each present evaluation object whether or not it corresponds to a human body. As a consequence, detection sensors can base their decision on controlling doors or lights on the information whether a detected object is a human body or not.

The determination of single evaluation objects is done by the evaluation unit, where the evaluation plane, containing all points of reflection, is parsed by a neighbor zone, from the top to the bottom of the plane. Once a point or points of reflection are newly present in the neighbor zone, all the points of reflection within the neighbor zone are taken into account and the newly present point of reflection is assigned to an evaluation object. It is assigned to a new evaluation object, if there is no other point atop the newly present point within the neighbor zone, or to an existing evaluation object where the point of reflection has the smallest distance to the mathematical center of gravity of an existing evaluation object.

According to this procedure all points of reflection are grouped in a subset of points of reflection belonging to an evaluation object.

According to this evaluation even two or more people walking in parallel through the laser curtain can be distinguished.

According to a further improvement of the invention the points of reflection can be time integrated on the evaluation plane. This leads to a higher density of points of reflection and, therefore, evaluation objects can be better distinguished and detected objects can be classified in a more reliable way.

The time integration can be done based on a fixed time interval after a first detection of a detected object occurred.

According to a further improvement of the invention the time integration is done in a way that the subset of points of reflection is assigned to a time object by projecting the points of reflection in a width-time plane, where the height of the point of reflection is ignored. The width axis stretches depending on a predefined accumulation/integration time.

The points of reflection projected into the time-width plane are clustered as subsets assigned to time objects. Each time object is the main-set of points of reflection to generate the evaluation plane, where the time component of the point of reflection is neglected but the height is taken into account.

According to this procedure a more precise decision on the delimitation of time objects is possible.

Therefore, the acquired information is more accurate with regard to the amount of human beings passing subsequently.

The clustering of the time objects is preferably done by using DBSCAN Algorithm.

Preferably, the scanner generates multiple laser curtains that are tilted with respect to each other. Due to several laser curtains a more precise picture can be taken and the motion direction of the object can be taken into account.

The scanner preferably evaluates and/or generates multiple laser curtains subsequently.

As by taking into account at least two curtains, which are tilted relative to each other, two depth positions perpendicular to the width of the scanning plane can be evaluated. As the two planes are scanned subsequently the movement direction of a human being can be detected as the center of gravity in scanning time changes in the time width diagram in the moving direction of the detected object.

By using multiple laser curtains, a predefined accumulation time for time integration is longer or is equal to the time that is necessary for scanning the present laser curtains of the sensor.

The evaluation unit may not accept points of reflection that clearly refer to background effects. Therefore, background noise can be reduced at this stage.

The invention further refers to a human recognition sensor for analysing an object in a monitored area and deciding whether or not the object is a human body, comprising a laser scanner and an evaluation unit that is enabled to execute a method as described above.

A further aspect refers to a sensor that generates at least one laser curtain that is tilted less than 45° relative to the vertical axis. This allows an overhead scanning so that human bodies may be recognized when passing below the sensor.

The human recognition sensor may comprise a computational unit, preferably a microprocessor, microcontroller or FPGA on which the evaluation unit is implemented as software program, executing the above described method.

Further advantages, features and potential applications of the present invention may be gathered from the description which follows, in conjunction with the embodiments illustrated in the drawings.

Figure 1B:
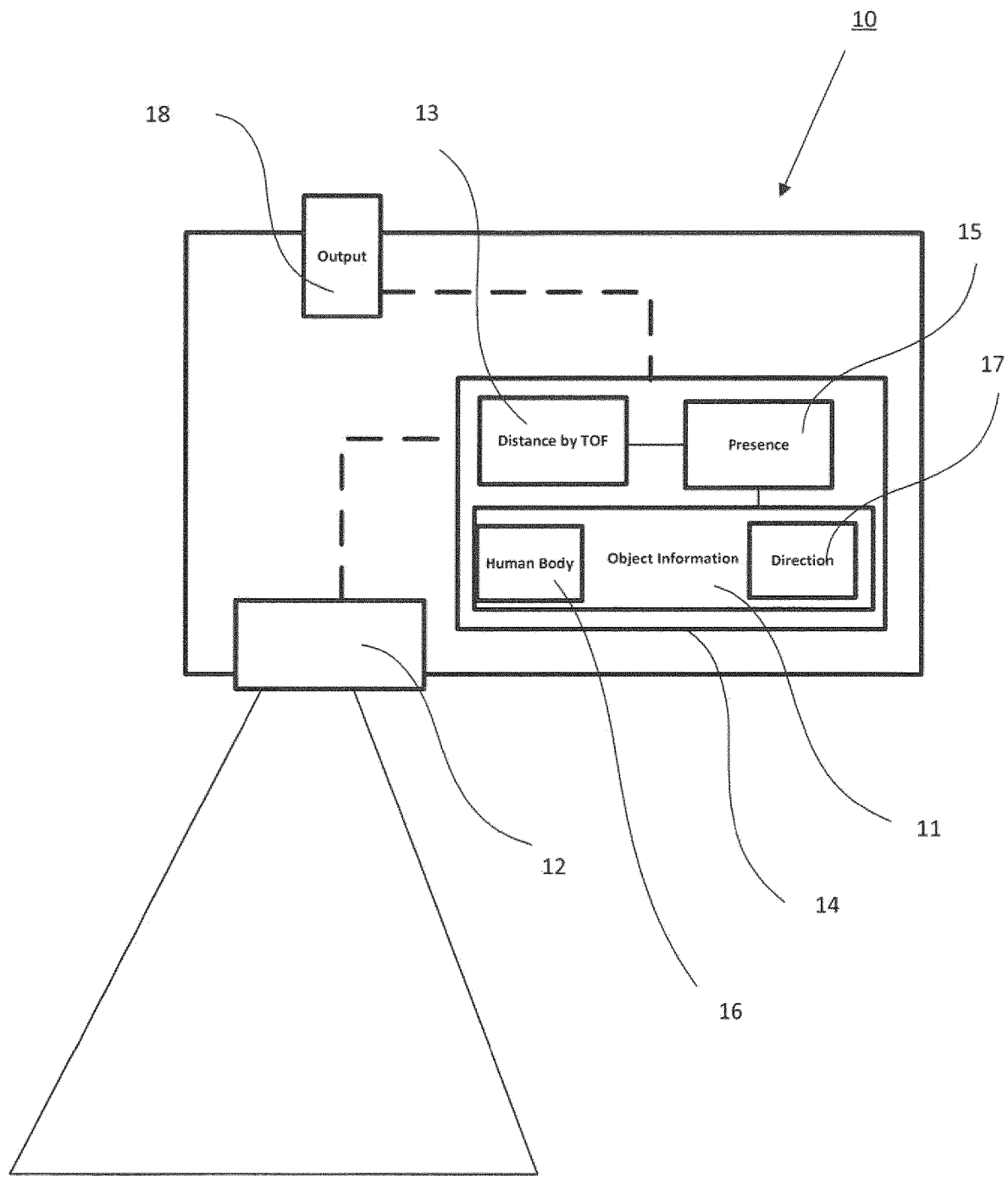
Figure 3:
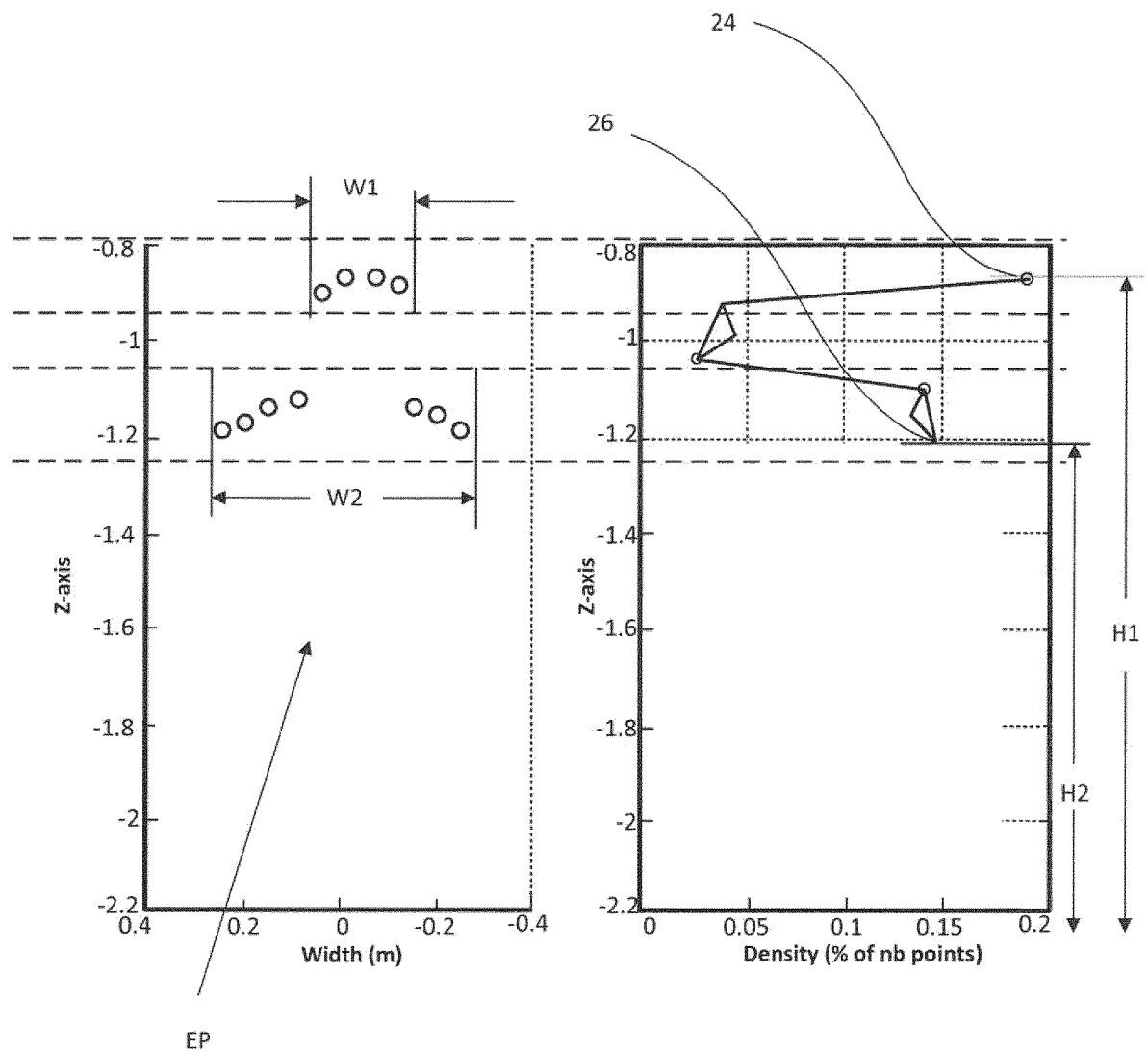
Figure 6A:
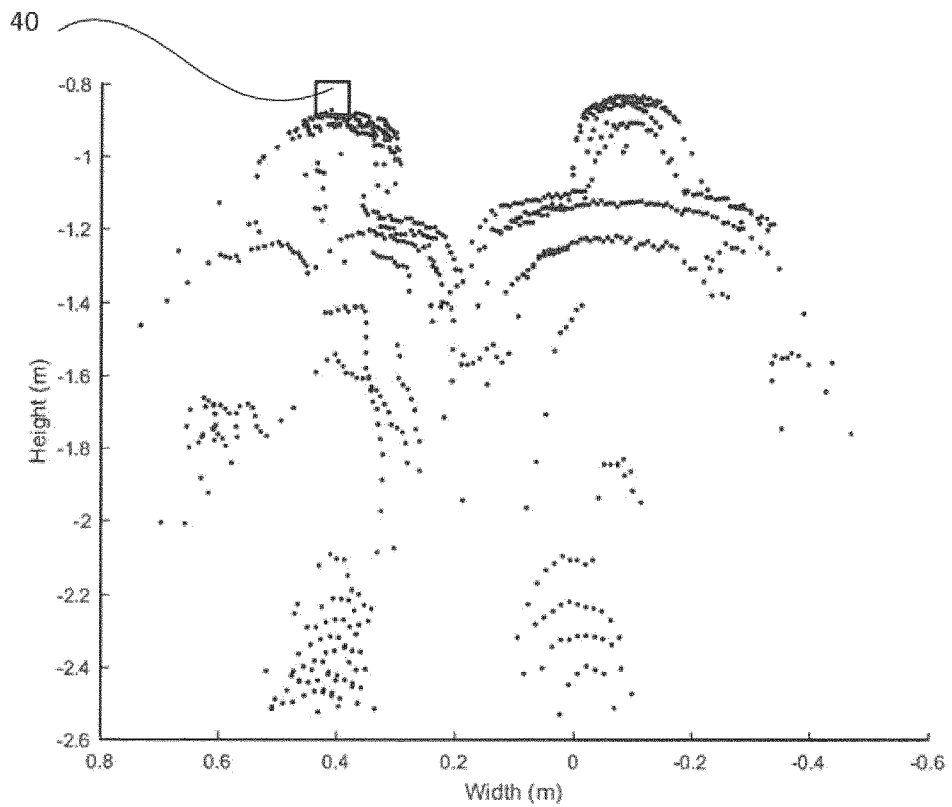
Figure 6B:
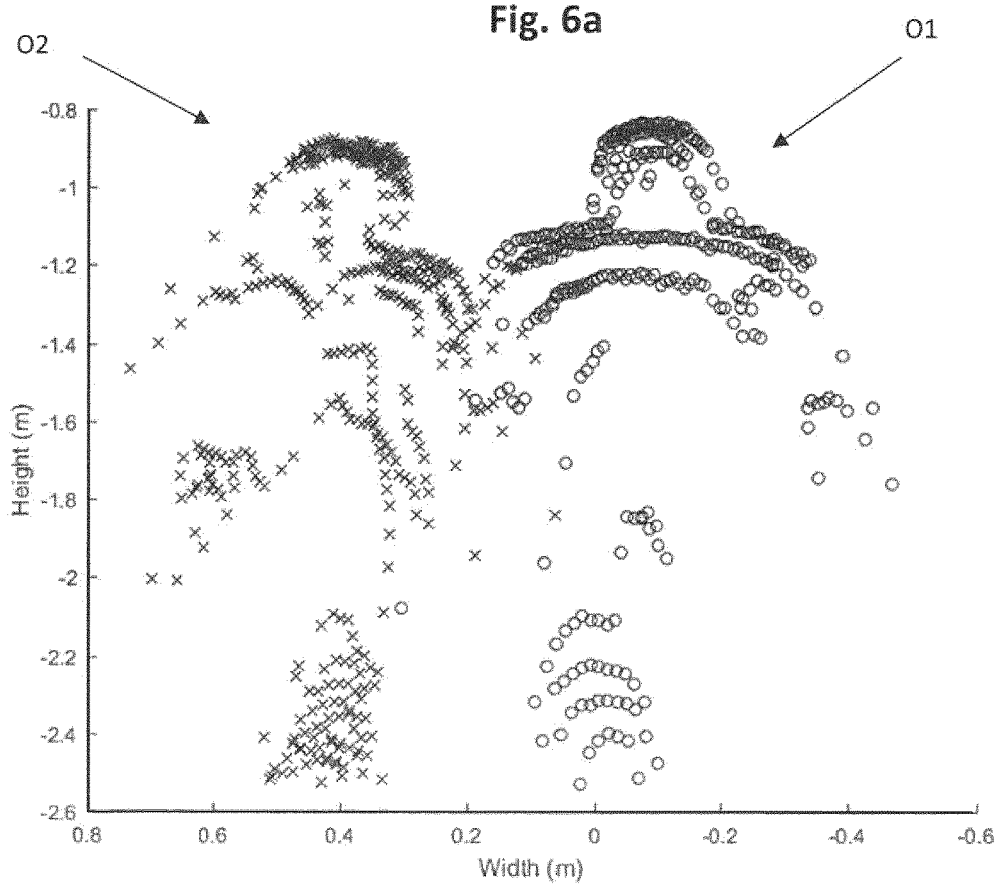
Figures 7A, 7B:
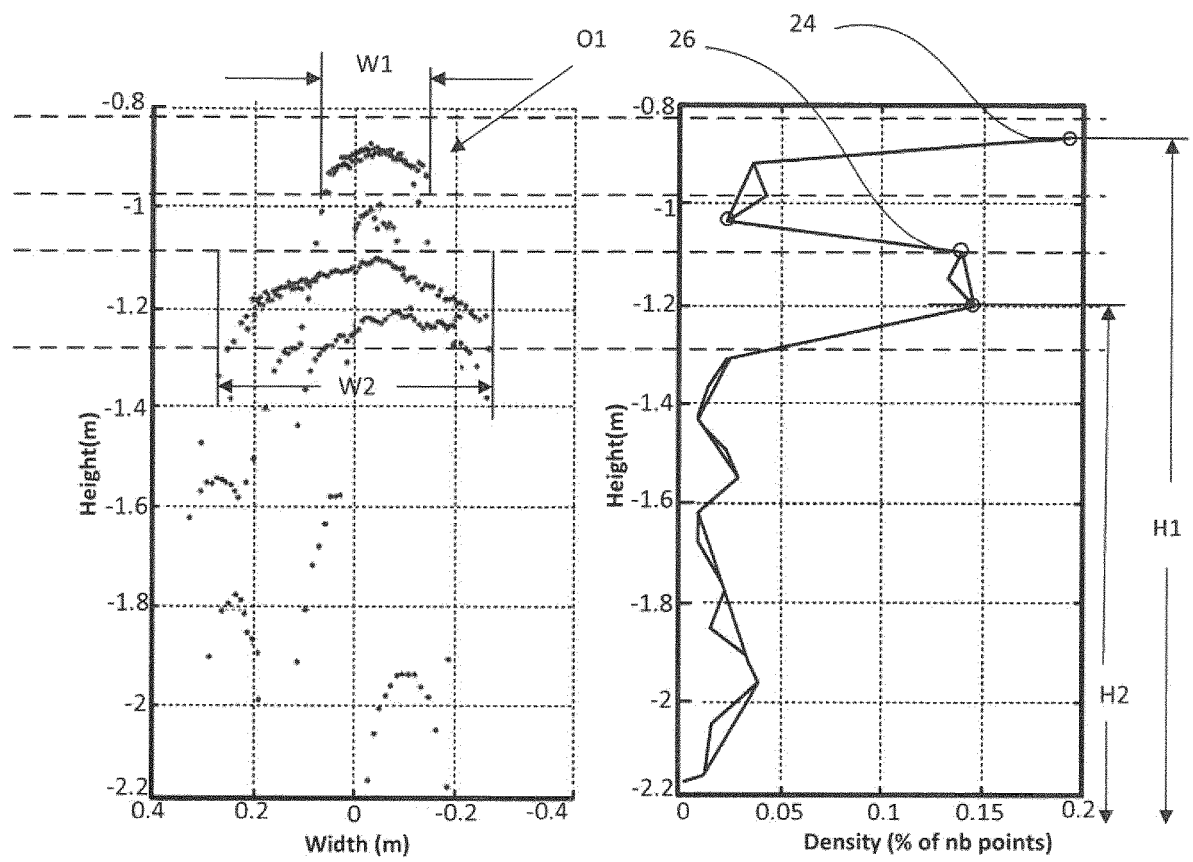

Throughout the description, the claims and the drawings, those terms and associated reference signs will be used as are notable from the enclosed list of reference signs. In the drawings is shown FIG. 1a a schematic view of a door sensor according to the invention;

FIG. 1b a schematic view of a further embodiment of a door sensor according to the invention;

FIG. 2a first embodiment of a sensor according to the invention having one scanning curtain;

FIG. 3 working principle of the evaluation unit of a human recognition sensor of FIG. 1;

FIG. 4a second embodiment of a sensor according to the invention having two scanning curtains;

FIG. 5a working principle of the evaluation unit describing a first step by generating time objects;

FIG. 5b enlarged view of a created time object;

FIG. 6a a view of the time object of FIG. 5b in the evaluation plane;

FIG. 6b a view of the time object after separation of human objects;

FIG. 7a a separated human object of FIG. 5b;

FIG. 7b a density distribution of the human object of FIG. 6a;

FIG. 8a a time width view on the time object of FIG. 5b for the first scanning curtain, and FIG. 8b a time width view for the time object of FIG. 5b for the second curtain.

FIG. 1a shows a first embodiment of a door sensor 10 according to the invention. The door sensor 10 comprises laser scanner 12, a processing unit 14, where the processing unit 14 comprises an evaluation unit 16 determining if an object is a human body. The processing unit 14 is connected to the laser scanner 12 as well as to output ports 18a, 18b in a way that the result of the object information unit 11 is fed to a dedicated output port 18a for providing object information to which information can be forwarded that contains information about human recognition results and that information related to the result of a presence detection unit 15 is fed to a further output port 18b dedicated to presence detection. Furthermore, the processing unit 14 comprises a distance determination unit 13 that is employing TOF to determine the distance of a point of reflection. This distance information is fed to the presence detection unit 15 that determines whether the point of reflection was caused by an object in a critical area. Furthermore the processing unit 14 comprises a direction determination unit 17 that is enabled to derive the motion direction of a human body or an object. Preferably the evaluation unit 16 and the direction determination unit 17 are grouped in the object information 11 unit so that both information can be merged and communicated to the output port 18a.

The laser scanner of the embodiment according to FIG. 1 uses at least two laser curtains that are evaluated by taking into account the point of reflections that are derived by light pulses (where the time of flight (TOF) is determined. According to this time of flight determination and the direction of the pulse a position of the point of reflection with regard to the laser scanner is derivable. This evaluation can be done by the processing unit 14, where relevant points of reflection are determined and their position is fed to the evaluation unit 16.

According to this setup the evaluation unit 16 receives the data of the point of reflection with regard to the laser scanner.

The evaluation unit 16 then analyses the point of reflections according to the invention as will be further described in the following figures and as a result will output a signal containing information whether or not an detected object as a human body.

FIG. 1b shows a schematic view of a further embodiment of a sensor according to the invention.

In difference to the example of FIG. 1a the further embodiment comprises a common output port 18 for the presence detection information as well as the object information. E.g. a common CAN signal is produced within the processing unit 14 that is forwarded to the output port. When creating the signal it is essential that the presence detection signal has a higher priority than the object information as to cope with safety standards.

A further difference is shown in FIG. 1b as the distance information is fed to the presence detection unit 15 first and then forwarded to the object information unit, whereas FIG. 1a shows an example of a parallel working principle.

The method how the distance data are forwarded is independent of the solution of using a common output port or separate output ports. Therefore these aspects can be combined on demand.

Figure 2:
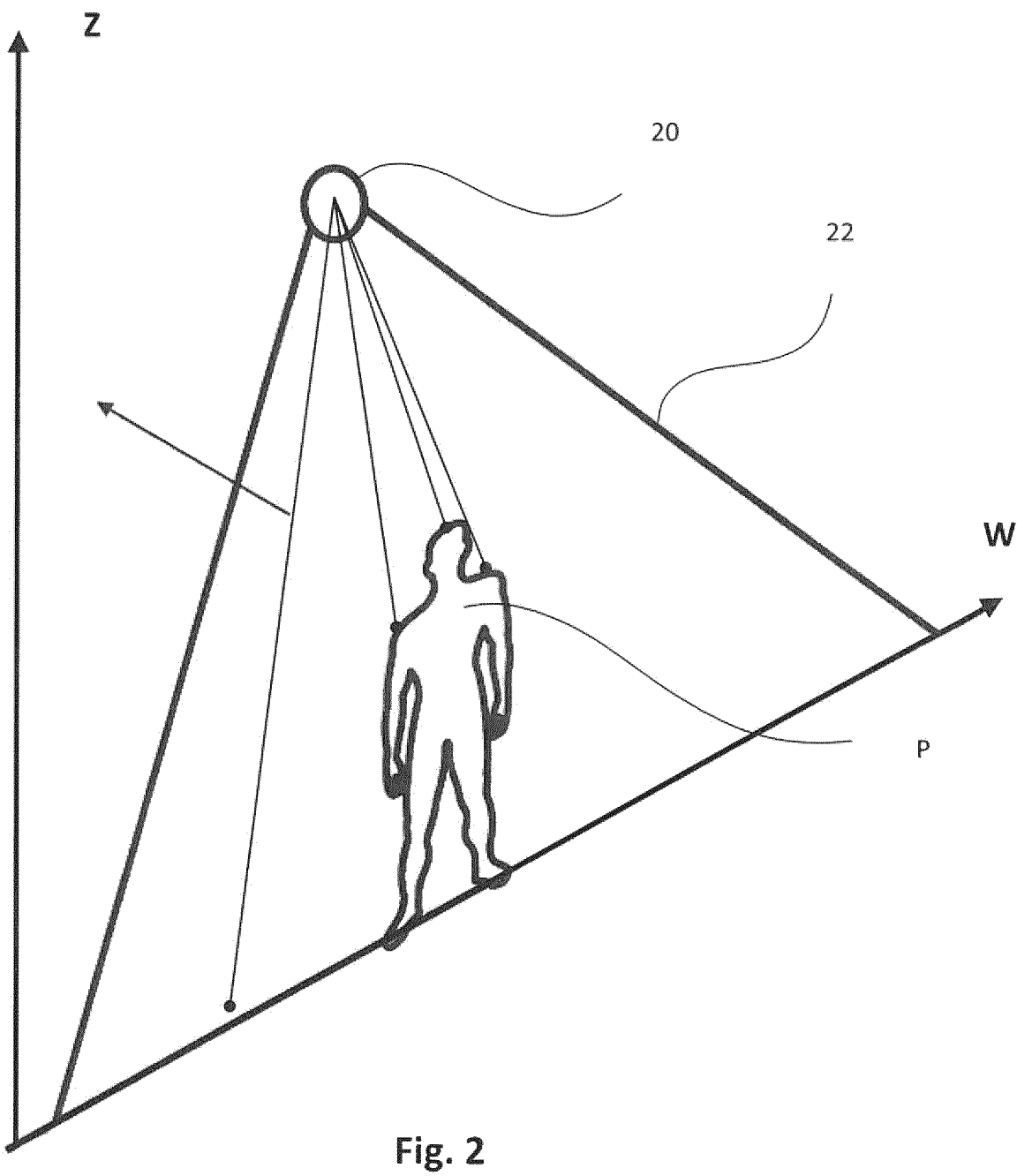

FIG. 2 shows an exemplary application where the human recognition sensor 20 is mounted on a top position, there are objects are passing below. The human recognition sensor 20 projects one laser curtain in a vertical direction, that stretches in a width direction W. It is shown as a person P is moving through the laser curtain 22 in a moving direction M. The passing person P reflects light pulses where the laser scanner of the human recognition sensor 20 evaluates the point of reflection within the laser curtain.

The evaluation unit of the sensor 20 is set in a way that it evaluates and evaluation plane EP that matches the laser curtain 22. Therefore the evaluation plane EP has a Z-axis in a vertical direction and the same width axis W as has the laser curtain 22.

FIG. 3 shows the method of human body recognition by evaluation of the evaluation plane EP, where in this case the points of reflection do not have to be projected into the evaluation plane EP as the evaluation plane EP matches the laser curtain 22. The points of reflection are applied to the evaluation plane EP according to their position. The evaluation plane EP has a Z-Axis and a width-axis W.

According to invention the evaluation unit 16 now computes a density distribution along Z-axis of the evaluation plane EP, where in this density distribution two peaks are supposed to be derivable.

If there is e.g. only one peak, the measurement is discarded and the evaluation object is not identified as a human body.

If there are two peaks 24, 26, as would be the case by detecting a human body the position H1, H2 of the position of the peaks on the Z-axis is taken. The first peak 24 is assumed to provide the overall height H1 of the object, being the head when viewing the human body and the second peak 26 is supposed to be the shoulder height H2 of a person. The ratio of overall height H1 and shoulder height H2 is compared to a range of predefined human body proportions. Furthermore, the head height (the distance between shoulder height and overall height; H1-H2) may be taken into account as well, as human body proportions change with age of the human beings.

According to this it is not necessary to limit the measurement to a minimum height that possibly might exclude children from detection, as they can be defined according to the above described evaluation.

Within the evaluation plane EP the width W2 of the shoulders the position H2 of the second density peak 26 can be determined. In the area of the first peak 24, the width of the head W1 can be determined. Due to these further parameters more precise evaluation of the object with regard to human body recognition can be achieved.

Figure 4:
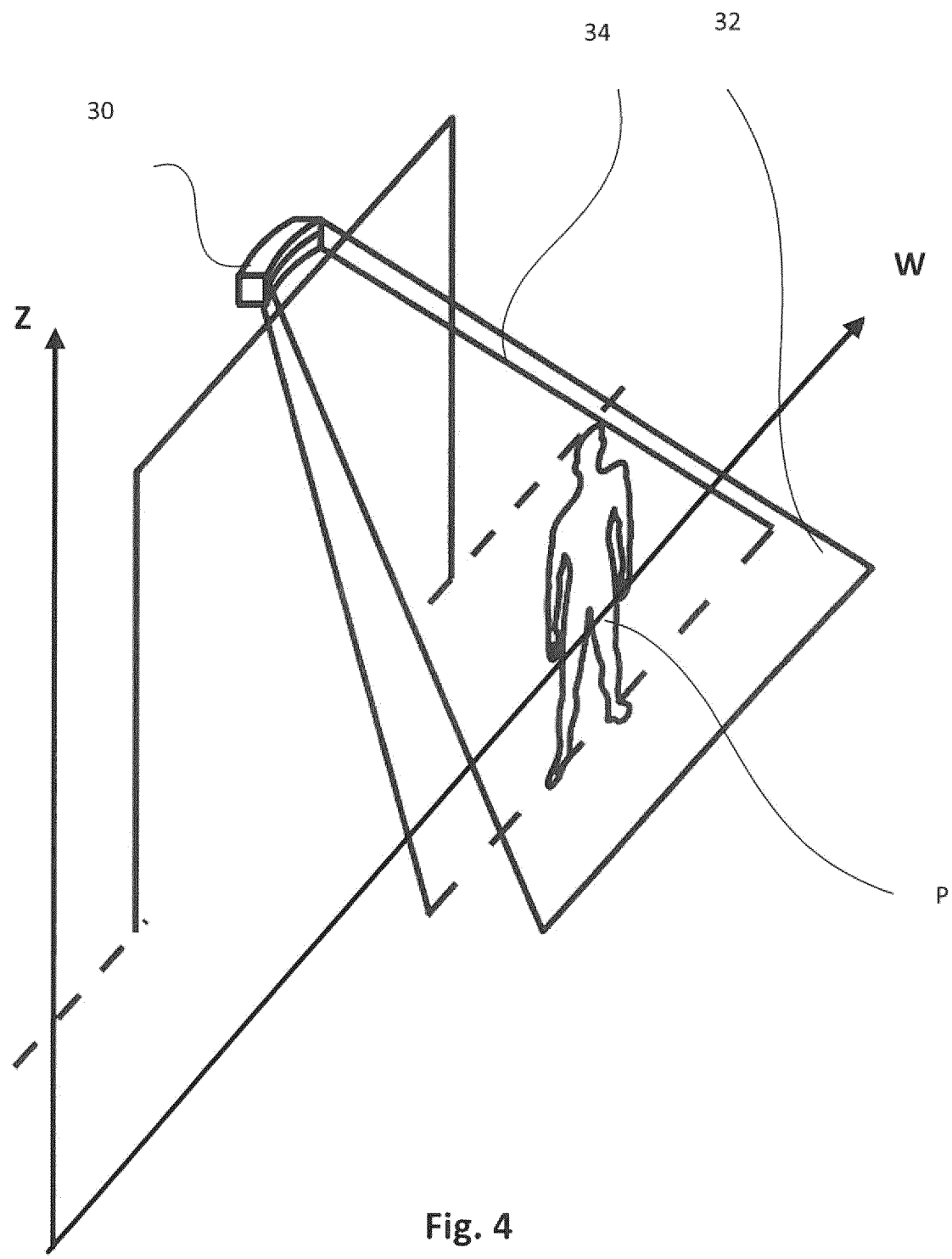

FIG. 4 shows a setup with a human recognition sensor 30 that generates multiple laser curtains 32, 34. The human recognition sensor 30 in this case is mounted above the door frame and monitors the area in front of the door. The laser curtains 32, 34 are tilted with regard to the vertical axis and with regard to each other and stretch parallel the door in a with direction W. The evaluation plane EP is set parallel to the door plane.

The laser scanner of the human recognition sensor 30 derives the position of the points of reflection of the detected object relative to the laser scanner, where the evaluation unit projects them into the evaluation plane EP as evaluation objects.

The persons P, when moving through the laser curtains 32, 34, produce points of reflection during an acquisition period.

As described in FIG. 5a the acquisition period is about 15 seconds. In the described case four detected objects subsequently pass through the laser curtains, where two detected objects pass the laser curtains at the same time. The evaluation unit is embodied to project the acquired points of reflection in a time-width plane.

In this time width-plane the present points of reflection are clustered to time-objects TO_1, TO_2, TO_3. This is done by using the DBSCAN algorithm.

The four detected objects passing the laser curtain during the acquisition period in this case lead to the definition of three time objects TO_1, TO_2, TO_3.

As shown in an enlarged view of the time-object TO_2 that there could be more detected objects in the time object TO_2.

The evaluation unit is further furnished to take the points of reflection of each time object and projects them into the evaluation plane EP, as shown in FIG. 6a. The evaluation plane has vertical Z-axis and a width axis W.

In a next separation step the evaluation unit assigns the points of reflection of each time object TO_1, TO_2, TO_3 to objects.

This is done by analyzing the evaluation plane EP from top to the bottom and assigning each point to an evaluation object.

The determination of single evaluation objects O1 is done by the evaluation unit, where the evaluation plane EP contains all points of reflection of the time-object TO_2. The evaluation plane EP is parsed by a neighbor zone 40 from the top to the bottom of the evaluation plane EP. Once a point or points of reflection are newly present in the neighbor zone 40, all the points of reflection within the neighbor zone 40 are taken into account and the newly present point of reflection is assigned to an evaluation object; e.g. see FIG. 6b object O2 (crosses) and object O1 (circles). It is assigned to a new evaluation object, if there is no other point atop the newly present point within the neighbor zone, or to an existing evaluation object where the point of reflection has the smallest distance to the mathematical center of gravity of an existing object, O1 or O2. According to this procedure all points of reflection are grouped in a subset of points of reflection belonging to an evaluation object O1, O2.

As a result FIG. 6b shows that the time object TO_2 of FIG. 5b has been separated into two evaluation objects O1, O2.

Each object in this evaluation plane as shown in FIG. 7a is then subjected to the density distribution analysis along the Z-axis as shown in FIG. 7b. In FIG. 7a, 7b object O1 is analyzed. The further evaluation to determine whether or not an object is a human body is done as described in FIG. 3, by comparing the applied measurements to anthropometric data.

According to a further improvement of the invention the evaluation unit may be enabled to analyse the moving direction of objects. This enables the human recognition sensor to provide direction information with the object information. E.g. this allows a count on how many people entered or left a building or to do the counting itself and just to provide the net count on the output port.

The moving direction is analyzed by comparing the accumulated points of reflection of the two curtains 32, 34 over a short period of time e.g. 500 ms. The points of reflection are projected into a time with plane, in which the mathematical center of gravity of the present points of reflection is determined for each curtain.

According to the shift of the center of gravity, indicated by the cross in FIG. 8a and FIG. 8b, the center of gravity passes firstly through the first curtain 32 and then through the second curtain 34, which is then the moving direction of the object.

LIST OF REFERENCE SIGNS 10 human recognition sensor
11 object information unit
12 laser scanner
13 distance determination unit
14 processing unit
15 presence detection unit
16 evaluation unit
17 direction determination unit
18a output port
18b output port
20 human recognition sensor
22 laser curtain
24 peak
26 peak
30 human recognition sensor
32 first laser curtain
34 second laser curtain
44 center of gravity
46 center of gravity
TO_1 time object
TO_2 time object
TO_3 time object
O1 object
O2 object
EP evaluation plane
P person
M moving direction
Z Z-Axis
W width axis

The invention claimed is:
1. Sensor (10) for controlling an automatic door, comprising:

a laser scanner (12) for detecting the presence of an object with multiple laser curtains (32, 34) tilted with respect to each other in a predefined detection area of a scanning field;

said laser scanner (12) emitting a signal;

said signal of said laser scanner is reflected as a reflected signal when encountering an object;

a processing unit (14);

said processing unit (14) includes a distance data acquisition unit (13), a presence detection unit (15), and an object information unit (11);

said distance data acquisition unit (13) acquires distances of the points on an object in said predefined detection area of said scanning field using said reflected signals from said object based on evaluation of time of flight of said signal and said reflected signal in real time;

said distance data acquisition unit (13) sends said acquired distances of said points on said object in said predefined detection area of said scanning field to said presence detection unit (15) in real time and processes said acquired distances of said points on said object in said presence detection unit (15) of said processing unit (14) before processing said acquired distances of said points on said object unit by said object information unit (11);

said presence detection unit (15) of said processing unit (14) processes said acquired distances of said points on said object first in real time;

said presence detection unit (15) of said processing unit (14) can detect objects smaller than 10 cm;

said presence detection unit (15) of said processing unit (14) processes said acquired distances of said points on said object with a higher priority than processing of said acquired distances of said points on said object by said object information unit (11) to determine whether or not said object is a human body;

said presence detection unit (15) evaluates whether or not an object is detected within said predefined detection area and:

if an object is detected by said presence detection unit (15) in said predefined detection area, said processing unit (14) sends a first signal to an output port (18b), and, if an object is not detected by said presence detection unit (15) in said predefined detection area, said processing unit (14) does not send a first signal to said output port (18b);

said object information unit (11) comprising a human body identification unit (16), said object information unit (11) receives said acquired distances of said points on said object, and said human body identification unit (16) uses said acquired distances of said points on said object to determine if said detected object is a human body and:

if an object is detected as a human body by said object information unit (11), said processing unit (14) sends a second signal to said output port (18a), and, if an object is not detected to be a human body by said object information unit (11), said processing unit (14) does not send a second signal to said output port (18a).

2. Sensor according to claim 1 characterized in that said object information unit (11) comprises a counting unit to count the number of human bodies detected by said human body identification unit (16), so that counting information is fed to the at least one output port (18a).

3. Sensor according to claim 1 characterized in that said object information unit comprises a motion detection unit to recognize the moving direction of an object.

4. Sensor according to claim 1, characterized in that the output ports (18a, 18b) are a physical or wireless port.

5. Sensor according to claim 1 characterized in that processing of said presence detection signal occurs in less than 90 ms.

6. Method of human body recognition, comprising the steps of:

analyzing a detected object (P) in a monitored area;

deciding whether or not said detected object is a human body using a laser scanner (12) positioned above said monitored area and above human bodies thereunder;

said laser scanner (12):

generating multiple laser curtains (32, 34) tilted with respect to each other using said laser scanner (12), each of said laser curtains (32, 34) is generated by multiple pulses evaluated by time of flight (TOF) measurement of single pulses to generate the distances of the points of reflection with respect to the laser scanner (12) position;

combining distances of said points of reflection with the direction of the pulse to retrieve a position in a predefined detection zone within a monitored area;

time integrating said points of reflection over an acquisition period and projecting them onto an evaluation plane (EP) as evaluation objects (O1, O2), said evaluation plane (EP) has a Z-axis that is related to the height and a perpendicular axis to said Z-axis that is related to the width in the direction of the lateral extension of said laser curtain (32, 34), said evaluation plane (EP) is evaluated based on the density distribution of said points of reflection along the Z-axis and the evaluation result is compared to anthropometric parameters, said anthropometric parameters include height, width, shoulder height, head width, and total height of a human body.

7. Method according to claim 6 characterized in that:

said points of reflection belonging to an evaluation object (O1, O2) are evaluated based on density distribution over height, head height (H1) and shoulder height (H2) are derived from said evaluation objects, and, said anthropometric parameter is head height (H1) to shoulder height (H2) ratio and is compared to a predefined range for a human body.

8. Method according to claim 7 characterized in that:

said head height (H1) and said shoulder height (H2) are derived by evaluating the peaks (24, 26) of said density distribution.

9. Method according to claim 6 characterized in that:

said evaluation plane (EP) is evaluated due to density distribution over height, where head width (W1) and shoulder width (W2) are derived by taking the width (W1, W2) at the peaks of the corresponding density distribution.

10. Method according to claim 9 characterized in that:

said anthropometric parameter is head width (W1) to shoulder width (W2) ratio, which is compared to a predefined range for human body proportion.

11. Method according to claim 6 characterized in that:

said points of reflection are time integrated using a DB SCAN algorithm.

* * * * *